United States Patent
Heaton et al.

(10) Patent No.: US 6,424,486 B2
(45) Date of Patent: Jul. 23, 2002

(54) METHOD AND APPARATUS FOR POSITIONING A READ/WRITE HEAD OF A HARD DISK DRIVE

(75) Inventors: Mark W. Heaton, Dallas; Michael K. Masten, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/992,598

(22) Filed: Dec. 17, 1997

(51) Int. Cl.⁷ ............................................. G11B 5/596
(52) U.S. Cl. .............................. 360/78.05; 360/78.14; 360/77.07
(58) Field of Search ........................ 360/78.05, 78.11, 360/78.12, 78.04, 78.14, 77.02, 77.07, 77.08, 77.11

(56) References Cited

U.S. PATENT DOCUMENTS 5,901,010 A * 5/1999 Glover et al. ............ 360/78.12
5,920,441 A * 7/1999 Cummingham et al. . 360/78.05

* cited by examiner

Primary Examiner—Andrew L. Sniezek
(74) Attorney, Agent, or Firm—W. Daniel Swayze, Jr.; Wade James Brady III; Frederick J. Telecky, Jr.

(57) ABSTRACT

A hard disk drive system (10) includes a rotating magnetic disk (16), and a support arm (22) which is supported for movement relative to the disk under control of a voice coil motor (21). a microactuator (26) supports a read/write head (27) on the support arm for movement relative thereto a control arrangement (13) controls the voice coil motor and the microactuator in response to position information (31), which is read by the read/write head from the disk and which indicates the position of the read/write head relative to the disk. The system is free of a sensor for detecting the actual position of the support arm relative to the read/write head or the disk.

8 Claims, 6 Drawing Sheets

METHOD AND APPARATUS FOR POSITIONING A READ/WRITE HEAD OF A HARD DISK DRIVE

TECHNICAL FIELD OF THE INVENTION

This invention relates in general to dual actuator systems for positioning one part relative to another and, more particularly, to a method and apparatus for positioning a read/write head relative to a hard disk using a voice coil motor and a microactuator.

BACKGROUND OF THE INVENTION

A hard disk drive typically includes a rotating magnetic disk and a read/write head supported adjacent one side of the disk for approximately radial movement relative to the disk. Data on the disk is organized in the form of a plurality of concentric tracks, each track being subdivided into a plurality of arcuate sectors that are circumferentially distributed. Each track also includes servo information which can be read by the read/write head, which identifies the particular track, and which also indicates the extent to which the read/write head is or is not accurately radially aligned with that track.

The read/write head is typically supported on a movable support arm, and an actuator such as a voice coil motor is provided in order to effect movement of the support arm. When the support arm is moved, the read/write head thereon is moved in a direction approximately radially of the disk. A control system is responsive to the servo information read from the disk by the read/write head for controlling the voice coil motor so as to position the support arm in a manner that radially aligns the read/write head with a selected track on the disk.

The capacity of hard disk drives is progressively increasing, due in part to a progressive increase in the number of concentric tracks provided on a given hard disk. Of course, the radial widths of the tracks decrease as the number of tracks is increased. As a result, there has been an increase in the precision and resolution needed for controlling the radial position of the read/write head in order to keep it aligned with a particular track. A further consideration is that, as central processing units become progressively faster, there is an associated increase in the need for hard disk drives with faster seek and access times.

One proposed approach for achieving greater precision and resolution while reducing seek and access times involves the use of a microactuator to movably support the read/write head on the support arm. Microactuators are miniature actuators or motors, which may be fabricated on silicon using semiconductor fabrication techniques, and which are sometimes referred to as microelectromechanical systems (MEMS). A microactuator is capable of effecting rapid and accurate movement of the read/write head relative to the support arm, in a direction approximately radially of the disk, but within a relatively small range of movement. The voice coil motor is thus used to move the support arm to effect coarse positioning of the read/write head, and the microactuator is used to effect fine positioning of the read/write head.

The servo information read from the disk by the read/write head identifies only the position of the read/write head relative to the disk. In a typical hard disk drive system without a microactuator, the read/write head is fixedly supported on the support arm, and thus the position of the support arm is directly related to the position of the read/write head. On the other hand, when a microactuator is provided between the support arm and the read/write head, the microactuator facilitates movement of the read/write head relative to the support arm. Thus, knowledge of the actual position of the read/write head based on the servo information read from the disk provides no information at all regarding the actual position of the support arm.

Accordingly, it has been considered necessary to supplement the position information from the read/write head with a sensor that determines the actual position of the support arm, either by directly sensing the position of the support arm, or by sensing the amount of relative movement effected by the microactuator between the support arm and read/write head. However, the need to provide such a sensor decreases the reliability of the system, while increasing its costs. In this regard, as storage capacity increases and the number of tracks increases, the actual position of the support arm must be determined with progressively increasing resolution and precision, which in turn involves increased cost and complexity for the sensor and associated circuitry that are provided to detect the actual position of the support arm. Consequently, while existing hard disk drives which use microactuators have been generally adequate for their intended purposes, they have not been satisfactory in all respects, due in part to the need to provide a sensor and supplementary circuitry.

SUMMARY OF THE INVENTION

From the foregoing, it may be appreciated that a need has arisen for a method and apparatus for controlling a dual actuator system with just a single source of position information. According to the present invention, a method and apparatus are provided to address this need, and involve: providing a first actuator to move a second part relative to a member; providing a second actuator to effect movement of the member relative to a first part, the first and second actuators each effecting relative movement of the first and second parts; receiving an input signal that specifies a target position of the second part relative to the first part; generating a first actuator control signal as a function of the input signal and without sensing an actual position of the member, the first actuator control signal causing the first actuator to move the second part toward the target position with respect to the first part; and generating a second actuator control signal as a function of the first actuator control signal and without sensing an actual position of the member, the second actuator control signal causing the second actuator to move the member in a manner so that the second part moves toward the target position with respect to the first part.

BRIEF DESCRIPTION OF THE DRAWINGS

A more complete understanding of the present invention will be realized from the detailed description which follows, taken in conjunction with the accompanying drawings, in which.

DETAILED DESCRIPTION OF THE INVENTION

Figure 1:
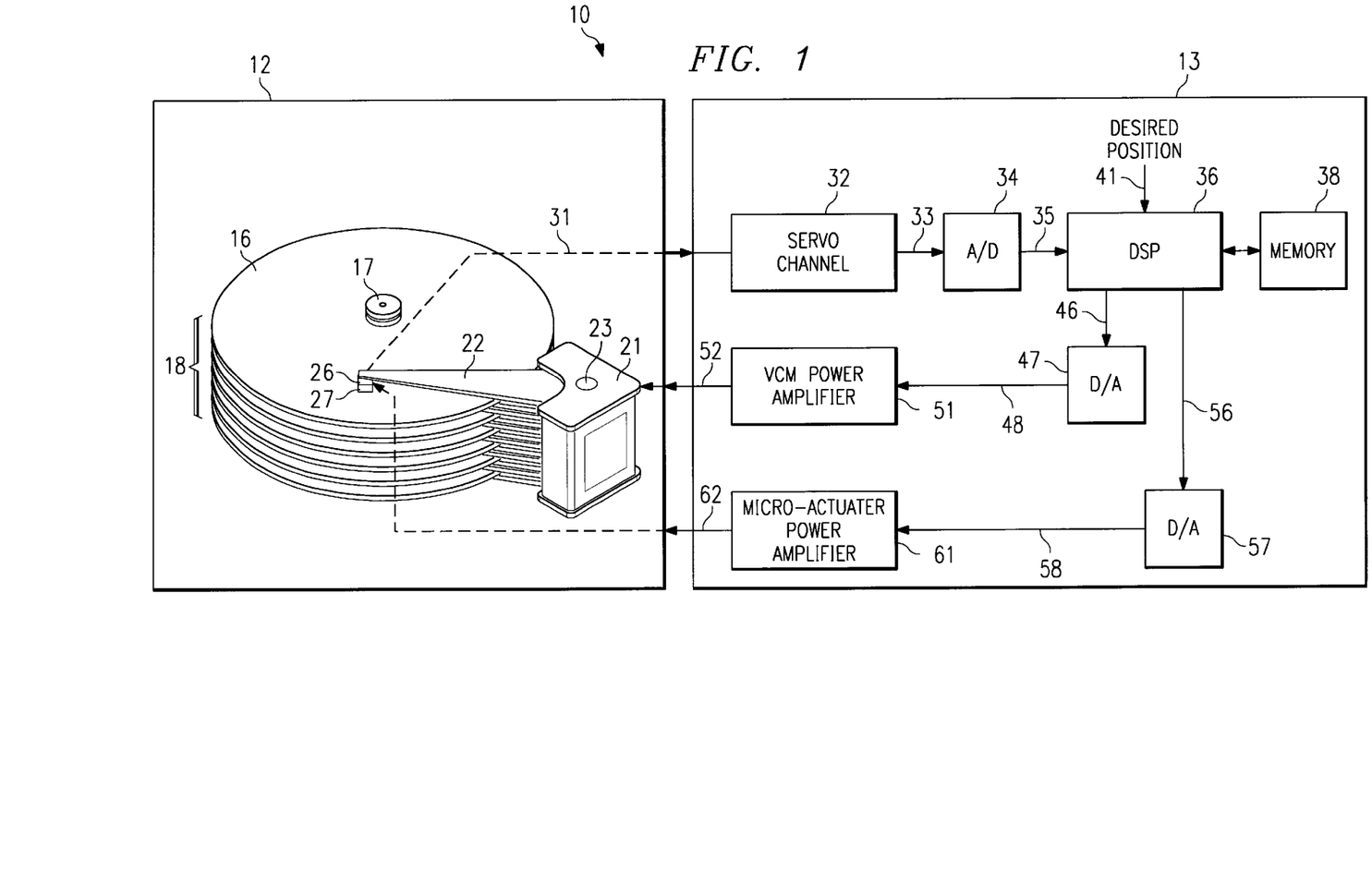
FIG. 1 is a block diagram of a hard disk drive system which embodies the present invention.

FIG. 1 is a diagrammatic view of a hard disk drive system 10 which embodies the present invention. FIG. 1 depicts only the portions of the system 10 which are pertinent to an understanding of the present invention. The system 10 includes a disk/head assembly 12, and a control circuit 13.

The disk/head assembly 12 includes a plurality of spaced and parallel disks 16, which are each fixedly supported on a spindle 17. The spindle 17 and the disks 16 together define a stack 18. The spindle 17 and the disks 16 thereon are rotatably driven by a not-illustrated spindle motor. The disks 16 each have on both sides thereof a magnetic coating, which stores information. The stored information on each side of each disk is organized in the form of a plurality of concentric tracks, which are not illustrated. Each track is broken into a plurality of arcuate and circumferentially distributed sectors. Each sector of each track includes servo information. The servo information provides position information, so that a read/write head may be properly positioned relative to the particular track on the particular disk 16.

The disk/head assembly 12 further includes an actuator which is a voice coil motor (VCM) 21, and includes a plurality of support arms 22. The support arms 22 are pivotally supported on a stationary axle 23 that is parallel to the spindle 17. The voice coil motor 21 urges simultaneous pivotal movement of the arms 22 about the axle 23. Each of the arms 22 has at the end thereof remote from the axle 23 a microactuator, one of which is shown at 26. The microactuator 26 is described in more detail later. Each microactuator supports a respective read/write head, one such read/write head being shown at 27.

Each read/write head is disposed adjacent a respective side of a respective disk 16 of the stack 18. When the voice coil motor 21 pivots the axle 23 and all of the support arms 22, the read/write heads 27 each move approximately radially with respect to the adjacent disk 16 in the stack 18. In addition, each microactuator 26 can effect a small amount of movement of the read/write head 27 thereon relative to the associated support arm 22, in a direction which causes the read/write head 27 to move approximately radially with respect to the adjacent disk 16 in the stack 18. Each read/write head 27 can read data from or write data to the associated disk 16, and can read the servo information from the disk 16. In general, just one read/write head 27 is active to read or write information at any given point in time.

Servo information read from a disk 16 by a read/write head 27 is supplied at 31 as an analog servo information signal to a servo channel circuit 32, which is a part of the control circuit 13. The servo channel circuit 32 processes the analog servo information signal so as to generate an analog position signal, which is supplied at 33 to an analog-to-digital (A/D) converter circuit 34. The A/D converter circuit 34 converts the analog position signal 33 to a digital position signal, and supplies it at 35 to a digital signal processor (DSP) 36. The DSP 36 is operatively coupled to a memory 38, which stores program instructions and data for the DSP 36. The DSP 36 receives at 41 a digital signal identifying a desired or target track, or in other words a track on one of the disks 16 with which the associated read/write head 27 is to be radially aligned. The desired or target track signal 41 may originate from a location external to the hard disk drive system 10, for example from a computer to which the hard disk drive system 10 is operationally coupled.

The DSP 36 outputs at 46 a digital voice coil motor control signal, which is received by a digital-to-analog (D/A) converter circuit 47. The D/A circuit 47 converts the digital signal 46 to an analog signal, which is supplied at 48 to a voice coil motor power amplifier 51, which amplifies the analog voice coil motor control signal. The amplified signal from the output of the amplifier 51 is supplied at 52 to the voice coil motor 21. The voice coil motor 21 is responsive to the signal 52 to urge pivotal movement of the arms 22 about axle 23.

The DSP 36 outputs at 56 a digital microactuator control signal, which is received by a further digital-to-analog (D/A) converter circuit 57. The D/A converter circuit 57 converts the digital microactuator control signal 56 to an analog signal, which is supplied at 58 to a microactuator power amplifier 61. The analog microactuator control signal is amplified by the amplifier 61, and then supplied to each of the microactuators 26, as shown diagrammatically at 62. Although the D/A converter circuit 57 and the amplifier 61 control all of the microactuators in the disclosed embodiment, it will be recognized that it would be possible to provide a separate D/A converter and amplifier for each microactuator, so that the DSP 41 could control the microactuators individually.

Figure 2:
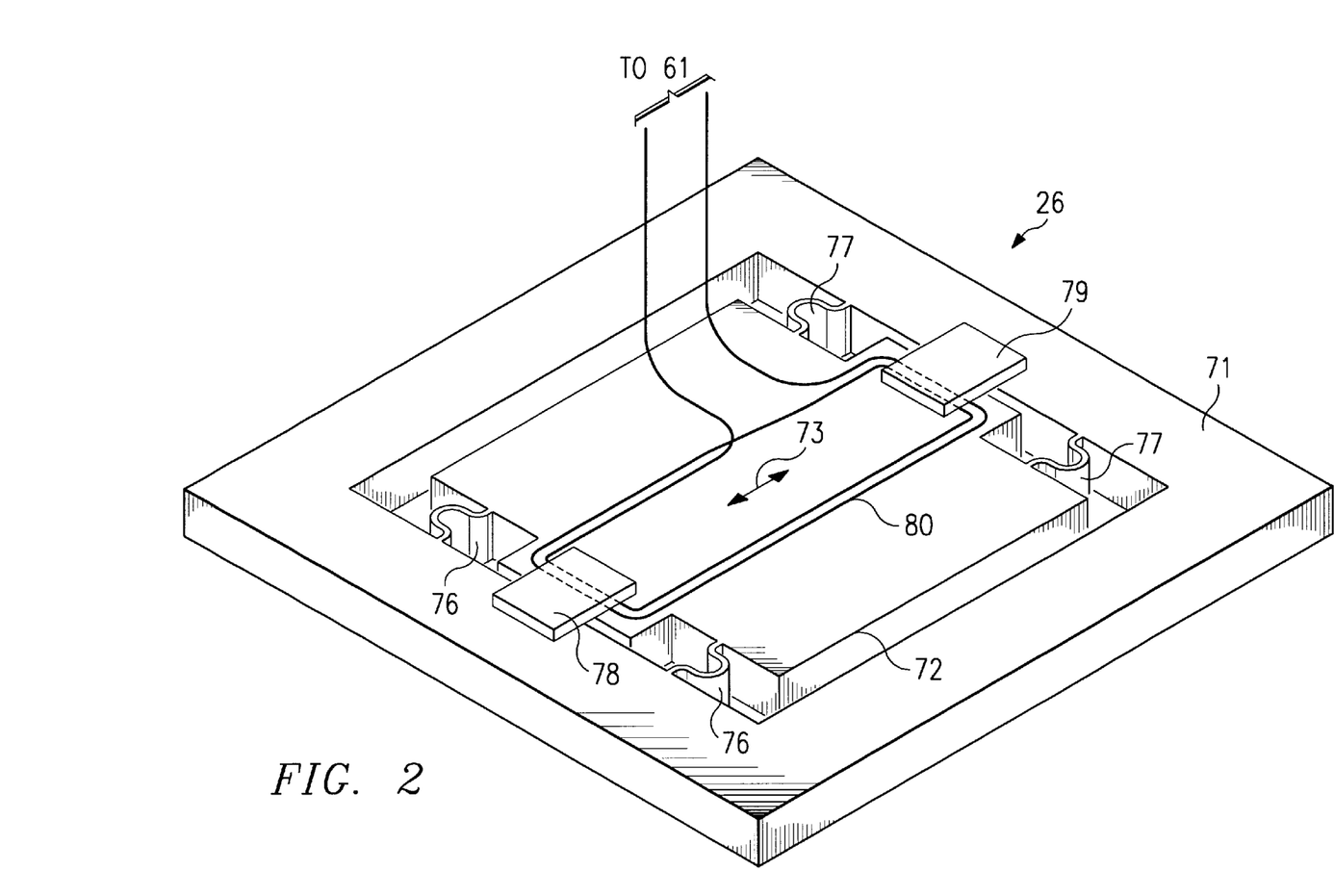
FIG. 2 is a diagrammatic perspective view of a microactuator which is a component of the hard disk drive system of FIG. 1.

The microactuator 26 will be briefly described in order to facilitate a better understanding of the present invention. The microactuator 26 is a small actuator or motor fabricated in silicon for the purpose of moving a load through a small range of travel. FIG. 2 is a diagrammatic perspective view of the microactuator 26. The microactuator 26 includes a base portion 71, and a member or platform 72 which is capable of a limited amount of movement relative to the base portion 71, in directions parallel to the arrows 73. The microactuator 26 has spring portions 76 and 77, which are disposed on opposite sides of the platform 72 and which urge movement of the platform 72 toward a central or equilibrium position. In the equilibrium position, the spring portions 76 and 77 do not exert any forces on the platform 72. If the platform 72 moves away from the equilibrium position in one direction parallel to arrows 73, two spring portions 76 are resiliently compressed and the two spring portions 77 are resiliently expanded, whereas if the platform 72 is moved away from the equilibrium position in the opposite direction, the two spring portions 77 are resiliently compressed and the two spring portions 76 are resiliently expanded.

The microactuator 26 further includes two permanent magnets 78 and 79, which are fixedly mounted on the base portion 71 on opposite sides of the platform 72. The magnets 78 and 79 are oriented to have inverse polarities. Although permanent magnets 78 and 79 are used in the disclosed embodiment, it will be recognized that small coils could alternatively be used to generate electromagnetic fields. A coil 80 is fixedly mounted on the platform 72, so that opposite sides of the coil are disposed beneath the magnets 78 and 79. When a current is passed through the coil 80, a small electromagnetic field is generated and urges the platform 72 to move away from its equilibrium position in a direction determined by the polarity of the current. Since the magnets 78 and 79 are oriented with inverse polarities, and since the portions of the coil 80 adjacent the magnets have respective current flows which are opposite, the platform will be urged in the same direction in the region of both magnets 78 and 79. The force exerted on the platform 72 in response to the coil current is a positioning force, and moves the platform 72 against the urging of the spring portions 76 and 77.

In microactuator 26, the distance which the platform 72 moves away from the equilibrium position is directionally proportional to the magnitude of the current supplied to the coil 80. Because of the small size of the microactuator 26, and the small. range of movement of the platform 72 relative to base portion 71, the speed with which the platform 72 can move relative to the base portion 71 is substantially faster than the speed with which the voice coil motor 21 (FIG. 1) can pivot the arms 22.

The base portion 71 of the microactuator 26 is fixedly secured on a support arm 22, with an orientation so that the direction indicated by arrows 73 is oriented approximately radially of the disks 16 in the platter stack 18. The associated read/write head 27 is fixedly supported on the platform 72. Thus, the read/write head 27 is moved approximately radially of the adjacent disk 16 in response to pivotal movement of the arms 22, or in response to movement of the associated actuator platform 72 in the direction of arrows 73. The spring portions 76 and 77 not only resist movement of the platform 72 and the read/write head 27 thereon away from the center or equilibrium position, but also provide support and alignment for the read/write head 27. In the disclosed embodiment, the range of movement of the platform 72 in either direction away from its equilibrium position relative to the base portion 71 corresponds to movement of the associated read/write head 27 by approximately four or five tracks in either direction away from a track with which the read/write head is currently aligned. Within this range of movement, the microactuator 26 can effect movement of the platform 72 relative to base portion 71 much faster than the voice coil motor 21 can effect an equal amount of movement of the. read/write head 27 by pivoting the arms 22. According, primary control for positioning the read/write head 27 is directed to the microactuator 26, and secondary control is directed to the voice coil motor 21.

In general, this means that a necessary positioning movement of the read/write head is first effected by using the microactuator 26 to move the read/write head 27 toward the new position, while directing the voice coil motor 21 to move the arms 22 until the platform 72 of the microactuator 26 has returned to its equilibrium position with the read/write head 27 aligned with a new track. For example, if the read/write head 27 is being maintained in radial alignment with a particular concentric track on the associated disk 16, the arms 22 will ideally be positioned so that there is no current flowing through the coil 80 of the microactuator, and thus the platform 72 will be in its equilibrium position. If the read/write head 27 shifts slightly radially relative to the track, a small amount of current will be supplied to the coil 80 in order to rapidly move the platform 72 of the microactuator 26 until the read/write head 27 is again in radial alignment with that track. Then, the arms 22 would be pivoted slightly while decreasing the current flowing through the coil 80 to zero, so that the read/write head 27 remains in radial alignment with the track as the platform 72 moves to its equilibrium position. As another example, essentially the same approach would be used where the read/write head 27 is to be moved to a different track which is less than four or five tracks away from the current track, or in other words within the range of movement of the platform 72 of the microactuator 26.

Still another example is a situation where the read/write head 27 is to be moved into radial alignment with a different track which is more than four or five tracks away from the current track, or in other words beyond the range of movement of the platform 72 relative to base portion 71. For example, the target track might be ten tracks away from the current track. In this situation, the primary control would attempt to use the microactuator 26 to rapidly position the read/write head 27 at the target track, but the platform 72 would reach the end of its range of travel after the read/write head moved four or five tracks and before the read/write head reached the target track. Further movement of the read/write head 27 toward the target track would then be effected through pivotal movement of the arms 22 by the voice coil motor 21. When the read/write head 27 reached the target track, the current through the coil 80 would be progressively decreased as the arms 22 slowed to a stop, until the platform 72 reached its equilibrium position with the arms 22 positioned so that the read/write head 27 was in radial alignment :with the target track.

In this particular type of situation, a system without a microactuator may limit the speed of pivotal movement of the arms 22 in order to avoid or minimize overshoot of the arms past their target position, because excessive overshoot and the resulting need for a corrective return movement could result in a longer seek time than simply moving the arms at a lower velocity. On the other hand, through the provision of the microactuator 26, the arms 22 can be pivoted at a higher rate of speed than in a system without a microactuator, and can be allowed to overshoot their target position so long as the overshoot is less than four or five tracks. In particular, if the read/write head 27 is within four or five tracks of the target track, the microactuator 26 can keep the read/write head 27 in alignment with the target track while the arms 22 are carrying out the overshoot and the necessary corrective return.

More specifically, as the read/write head 27 reached the target track in this situation, the current through the coil 80 of the microactuator 26 would be decreased to zero as the arms 22 moved to their target position, and then would be progressively increased with a reversed polarity as the arms 22 overshot their target position, so as to keep the read/write head in alignment with the target track. Thereafter, the reversed polarity current would be progressively decreased to zero during the corrective return of the arms 22 to their target position. If the arms 22 carried out a small amount of damped oscillation around their target position, the polarity of the current through the coil 80 of the microactuator might be changed several times in order to keep the read/write head 27 in accurate alignment with the target track during the oscillation.

Figure 3:
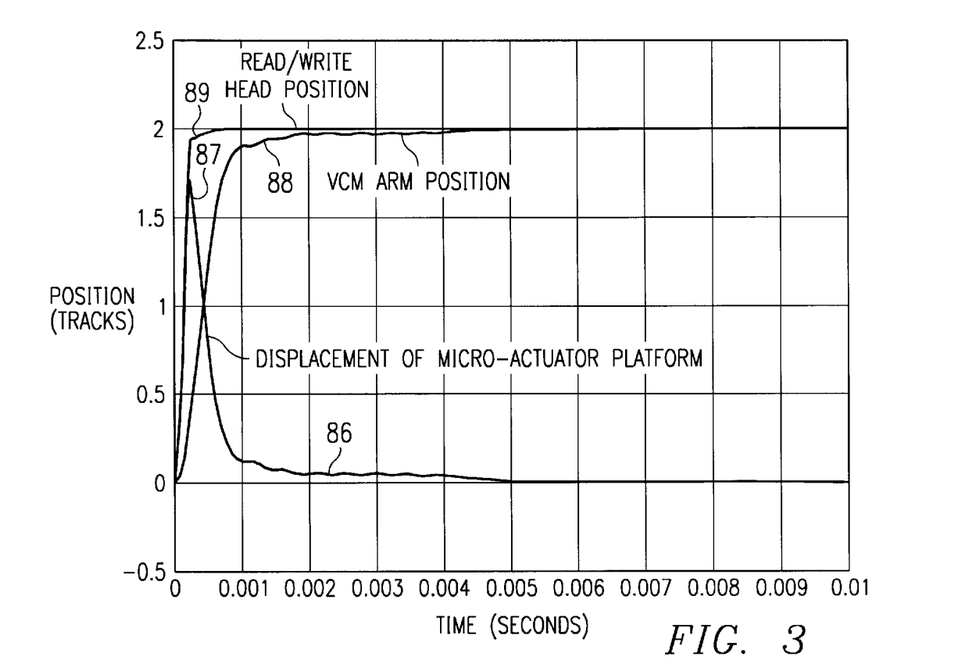
FIGS. 3 and 4 are graphs showing operational characteristics of the hard disk drive system of FIG. 1.

FIG. 3 is a graph showing a situation where the read/write head 27 is moved to a new track which is only two tracks away from the current track, where the vertical axis represents tracks and the horizontal axis represents time. More specifically, the displacement of the microactuator platform 72 is shown at 86. It will be noted that there is an initial spike at 87 representing an initial displacement of the microactuator platform that effects rapid movement of the read/write head by a distance of approximately 1.75 tracks, which is most of the two-track displacement required for the read/write head to reach its new position. The movement of the outer end of the support arm 22 is indicated at 88. By the time the microactuator 26 has moved the read/write head through a distance of 1.75 tracks, the support arm 22 is just starting to move. The position of the read/write head 27 is represented by the curve 89. Since the movement of the read/write head 27 is the sum of the movements caused by the microactuator and the actuator arms 22, the curve 89 is the sum of the curves 86 and 88.

Following the initial spike 87, the displacement of the microactuator platform 72 is gradually decreased until the microactuator platform is back in its equilibrium position, while the support arm 22 moves toward a new position in which it is displaced by a distance of two tracks from its original position. It will be noted that it takes the support arm between 0.004 and 0.005 seconds to reach its new position. Thus, if the microactuator was not present, it could take this long before the read/write head was aligned with the new track and could read or write information. In contrast, because of the provision of the microactuator, the read/write head reaches a position of steady alignment with the new track in less than 0.001 seconds, or in other words at least five times faster than in a system without a microactuator.

Figure 4:
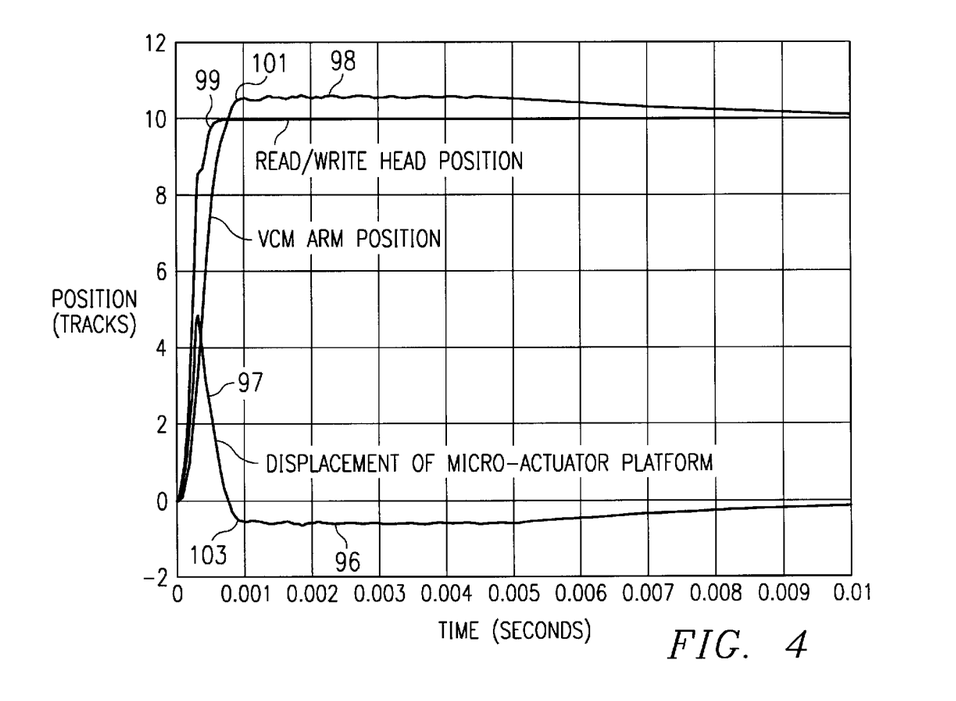

FIG. 4 is a graph depicting a situation where the read/write head is being moved to a target track which is ten tracks away from its current track. The displacement of the platform 72 of the microactuator is shown at 96, and includes an initial spike 97 that effects rapid movement of the read/write head 27 through a displacement of five tracks toward the new track. Since the range of movement of the microactuator platform is limited to about five tracks, further movement of the read/write head 27 toward the new track is effected by pivotal movement of the support arm 22. The movement of the read/write head 27 is the sum of the displacements of the microactuator platform and the support arm, and thus the curve 99 representing this movement is a sum of the curves 96 and 98.

After the initial spike at 97, the current through the coil 80 is progressively reduced, so that the microactuator platform 72 is moved back toward its equilibrium position as the support arm 22 moves through the last five tracks of a ten-track displacement. As the support arm 22 reaches its target position, the microactuator platform 72 reaches its equilibrium position at 103. However, the support arm 22 overshoots its target position at 101, and the microactuator is controlled after 103 so as to displace the platform 72 in a direction opposite its original displacement and by an amount sufficient to compensate for the overshoot of the support arm 22.

As evident from FIG. 4, the corrective movement of the support arm 22 does not bring the support arm 22 back to its target position until more than 0.01 seconds have elapsed from the start of movement. Nevertheless, because of the provision of the microactuator, the read/write head reaches its target position in approximately 0.0006 seconds after the start of movement, and is thereafter maintained in accurate alignment with the target track through appropriate control of the microactuator so as to compensate for the overshoot of the support arm 22.

With reference to FIG. 2, it will be recognized that, if the support arm 22 and the microactuator base portion 71 thereon are moved, the inertia of the platform 72 and read/write head on the platform will tend to urge the platform 72 to move relative to the base portion 71. The spring portions 76 and 77 will, of course, damp any such relative movement due to inertia. Similarly, if a current is passed through the coil 80 in order to urge movement of the platform 72, inertia of the read/write head 27 and the platform 72 will initially cause the base portion 71 and the support arm 22 to be urged in a direction opposite the direction of movement of the platform 72. Again, the spring portions 76 and 77 will damp out this inertial effect.

In order to effect proper control of the position of the read/write head 27, it is important to know the position of the support arm 22, which differs from the position of the read/write head 27 by an amount equal to the displacement of the actuator platform 72 relative to the base portion 71. It would be possible to determine the actual position of the support arm 22 through the provision of a sensor, which directly sensed the position of the support arm 22, or which sensed the displacement of the actuator platform 72 relative to the base portion 71. However, the disclosed embodiment avoids the need to provide such a sensor, through the use of microactuator 26 which, as mentioned above, has a displacement that is proportional to the magnitude of the current supplied to the coil 80. That is, the direction and magnitude of the displacement of the platform 72 corresponds to the polarity and magnitude of the microactuator current.

Figure 5:
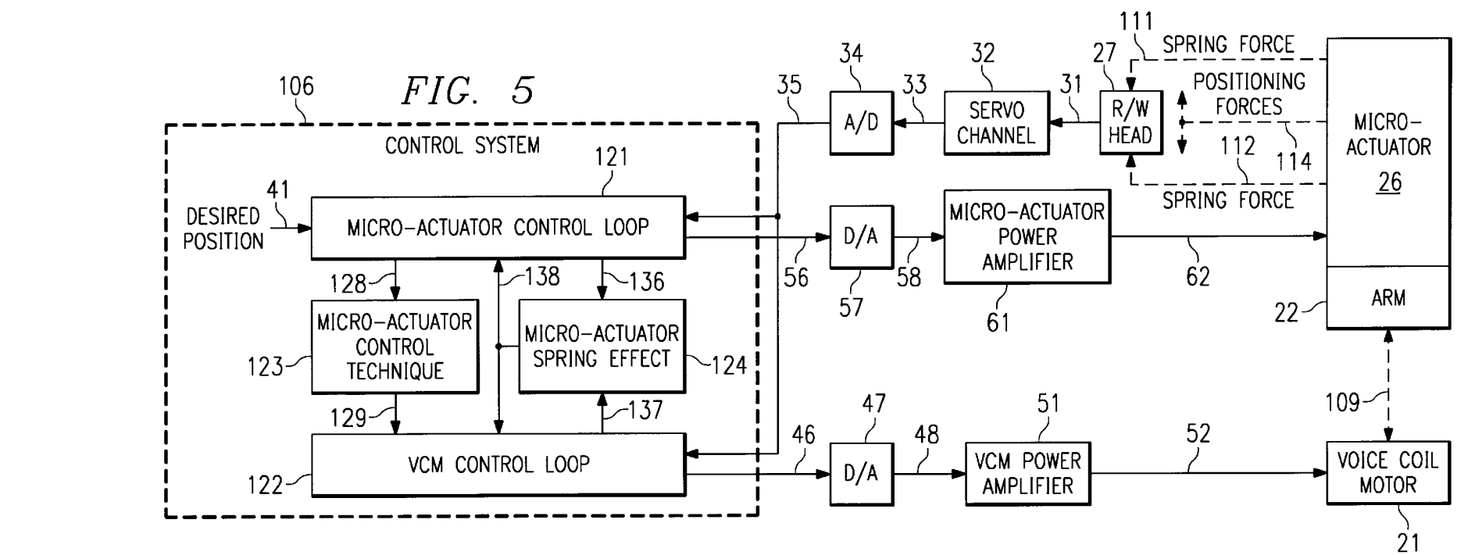
FIG. 5 is a block diagram of the hard disk drive system of FIG. 1, showing in more detail a control system which is part of the hard disk drive system.

FIG. 5 includes a block diagram of a control system 106 which is implemented in the DSP 36 of FIG. 1 in order to effect appropriate control of the microactuator 26 and the voice coil motor 21. Components in FIG. 5 which also appear in FIG. 1 are designated in FIG. 5 with the same reference numerals as in FIG. 1.

The movement of the support arms 22 by the voice coil motor 21 is shown diagrammatically at 109 in FIG. 5. The forces which the spring portions 76 and 77 can exert on the read/write head 27 are shown diagrammatically at 111 and 112, and the positioning forces exerted on the read/write head 27 in response to a microactuator current through coil 80 are shown diagrammatically at 114.

The control system 106 of FIG. 5 includes a microactuator control loop 121, a voice coil motor control loop 122, a microactuator control technique 123, and a microactuator spring effect adjustment block 124. The microactuator control loop 121 is responsive to the desired or target position signal 41, and the digital position signal 35 from the A/D converter circuit 34. The microactuator control loop 121 is also responsive to the output of the microactuator spring effect adjustment block 124. The microactuator control loop 121 generates the digital microactuator control signal 56, which is supplied to the D/A converter circuit 57.

As previously mentioned, the disclosed embodiment positions the read/write head 27 using the microactuator 26 for primary control and the voice coil motor 21 for secondary control. Stated differently, the voice coil motor 21 is controlled primarily as a slave or follower to the microactuator 26. Thus, in the disclosed embodiment, the desired or target position signal 41 is supplied to the microactuator control loop 121, but not to the voice coil motor control loop 122. Instead, an output signal 128 from the microactuator control loop 121 is suppled to the microactuator control technique 123, which in turn outputs a signal 129 to the voice coil motor control loop 122. The microactuator control loop 121 thus effects the primary response to the desired or target position signal 41 through appropriate control of the microactuator 26, whereas the voice coil motor control loop 122 carries out a slave or follower function.

The microactuator spring effect adjustment block 124 is responsive to signals 136 and 137 from the microactuator control loop 121 and the voice coil motor control loop 122, respectively. The signals 136 and 137 are indicative of the control implemented by the control loops 121 and 122. The microactuator spring effect adjustment block 124 outputs a signal 138, which is supplied to each of the control loops 121 and 122, and which is representative of at least one characteristic of the spring portions 76 and 77 of the microactuator 26.

Figure 6A:
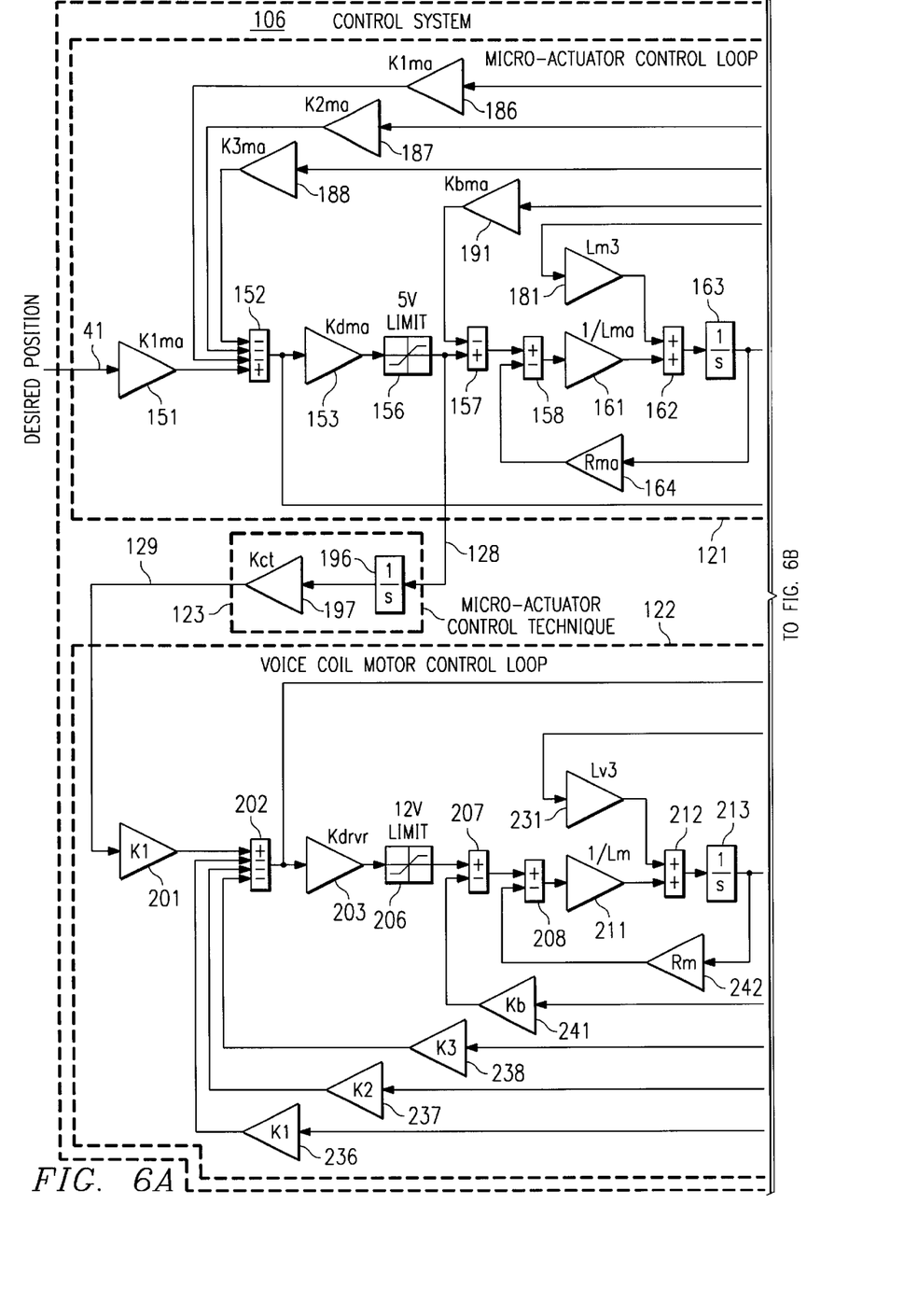
FIGS. 6A and 6B, which are collectively referred to hereinafter as FIG. 6, are respective portions of a block diagram showing in detail the control system of FIG. 5.
Figure 6B:
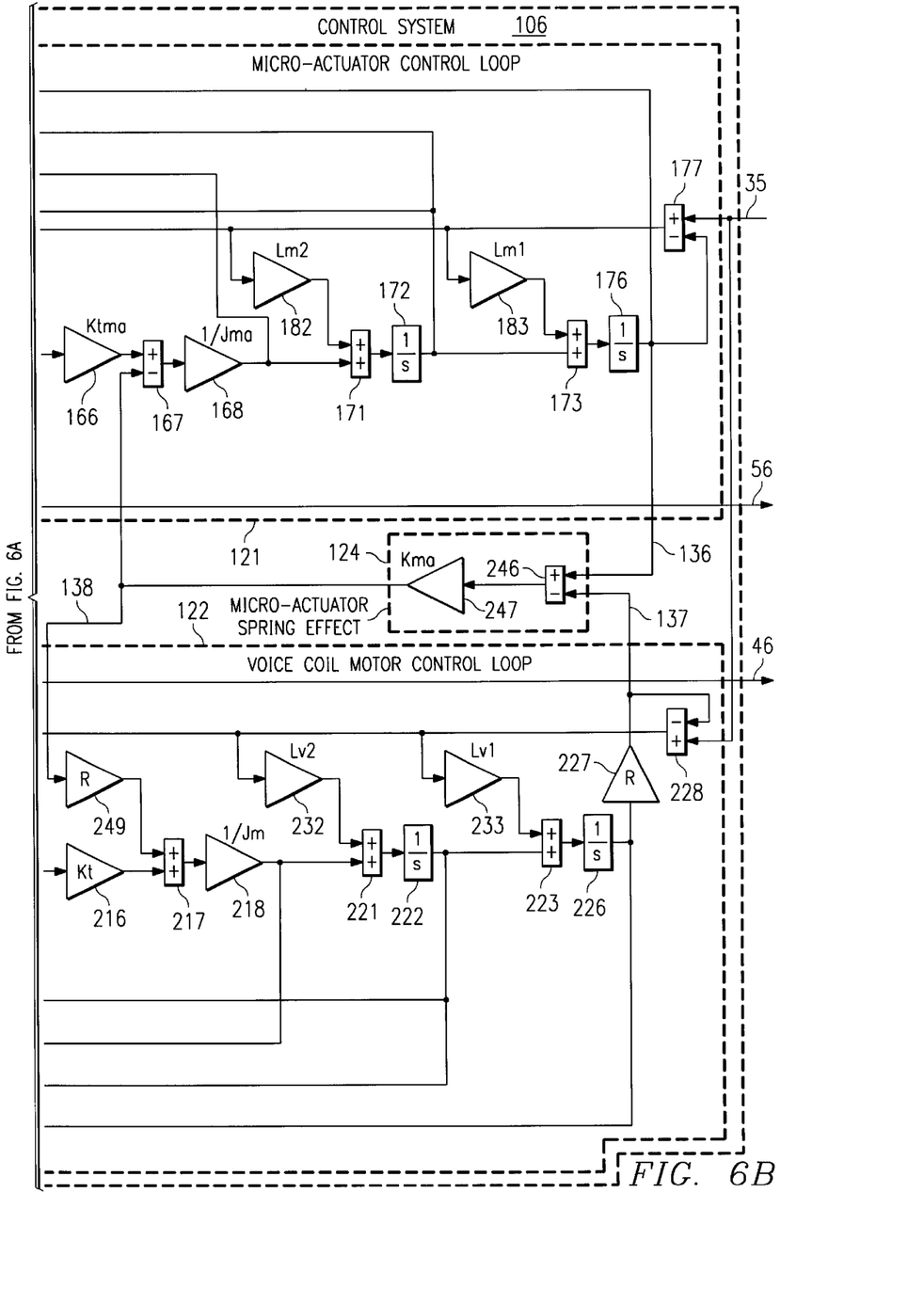

The control system 106 of FIG. 5 is shown in more detail in FIG. 6. With reference to FIG. 6, the microactuator control loop 121 includes a proportional gain element 151 which receives and scales the desired or target position signal 41 by a constant $K1_{ma}$. The output of the gain element 151 is coupled to a positive input of a junction 152, the output of which is coupled to an input of an amplifier 153 with a gain of $K_{dma}$. The output of the amplifier 153 is coupled to a limit block 156 which applies a limit to the output signal from amplifier 153. The blocks 153 and 156 correspond functionally to the microactuator power amplifier 61, which operates with a five volt supply and thus cannot produce an output signal in excess of five volts.

The output of the limit block 156 is coupled to a positive input of a junction 157, the output of which is coupled to the positive input of a junction 158. The output of the junction 158 is coupled to the input of a gain element 161. The gain of the element 161 is 1/Lma, where Lma represents an inductance which corresponds functionally to the inductance of the coil 80 of the microactuator 26. The output of the element 161 is coupled to a positive input of a junction 162, the output of which is coupled to an integrator 163. The integration function is designated symbolically by the LaPlace operator 1/s, which is normally associated with analog control loops, but it will be recognized that the integration function it represents may be implemented in the DSP 36 using an appropriate digital technique.

The output of the integrator 163 is coupled to the input of a gain element 166, gain element 166 having a gain $K_{tma}$ that represents a motor force constant. The output of the gain element 166 is coupled to a positive input of a junction 167, the output of which is coupled to an input of a gain element 168 having a gain of $1/J_{ma}$. The term $J_{ma}$ represents the combined mass of the microactuator platform 72 and the read/write head 27. The input to the gain element 168 is a force, and the output of the gain element 168 represents an acceleration. The output of element 168 is coupled to a positive input of a junction 171, the output of which is coupled to a further integrator 172. Since the input of integrator 172 is an acceleration, the output of integrator 172 represents velocity or speed. The output of integrator 172 is coupled to a positive input of a junction 173, the output of which is coupled to another integrator 176. Since the input to integrator 176 is a velocity or speed, the output of integrator 176 represents position, and in particular the estimated position of the platform 72 and thus the estimated position of the read/write head 27.

The output of integrator 176 is coupled to a negative input of a junction 177. The actual position signal 35 from the A/D converter 34 is supplied to a positive input of the junction 177. The output of the junction 177 thus represents a position error between the actual position of the read/write head, which is determined from the servo information read by the read/write head from the spinning disk, and the estimated position that the control loop 121 calculates the read/write head is theoretically expected to have in response to the control signals being output from the control system 106. The output of the junction 177 is coupled to the inputs of three gain elements 181–183, which have outputs respectively coupled to positive inputs of the junctions 162, 171 and 173, respectively. The gain elements 181–183 have respective gains of Lm3, Lm2 and Lm1, which are estimation gains that cause the elements 181–183 to function as state adjustors. That is, the elements 181–183 generate state adjustment values based on the position error from junction 177, and inject these values into the control loop through junctions 162, 171 and 173.

The outputs of the elements 176, 172 and 168, which respectively represent position, velocity and acceleration, are coupled to inputs of respective gain elements 186–188, which have respective proportional gains of K1ma, K2ma and K3ma. The outputs of the gain elements 186–188 are coupled to respective negative inputs of the junction 152, and the elements 186–188 thus define respective feedback paths. The output of the element 172 is similarly coupled to the input of a further gain element 191, which has a gain Kbma representing the back emf of the coil 80 of the microactuator. The output of the element 191 is coupled to a negative input of the junction 157, thus defining a further feedback path. The output of the element 163 is coupled to the input of a gain element 164 having a gain Rma, which is representative of a resistance of the coil 80 of the microactuator. The output of the element 164 is coupled to a negative input of the junction 158, and the element 164 is thus part of another feedback path.

The output of the junction 152 serves as the microactuator control signal 56, which is supplied through D/A converter circuit 57 to the microactuator power amplifier 61. The output of the limit element 156 serves as the signal 128 to the microactuator control technique 123. The signal 128 is representative of the direction and magnitude of the displacement of the platform 72 of the microactuator 26. Since a goal in controlling the voice coil motor 21 is to cause it to position the arm 22 so that the platform 72 is at its equilibrium position, or in other words has a displacement of zero, the signal 128 may be viewed as an error signal for purposes of controlling the voice coil motor 21. Accordingly, the input signal 129 to the voice coil motor control loop 122 is derived from the signal 128 through the control technique 123, for purposes of causing the control loop 122 to appropriately control the positioning arms 22.

More specifically, the microactuator control technique 123 includes an integrator 196 which receives and integrates the signal 128, the output of the integrator 196 being coupled to the input of a gain element 197. The gain element 197 has a gain Kct which is a constant. The output of the gain element 197 serves as the signal 129 supplied to the input of the voice coil motor control loop 122.

The voice coil motor control loop 122 includes a gain element 201 which receives the signal 129, scales it by a proportional gain Ki, and supplies the result to a positive input of a junction 202. The output of the junction 202 is coupled to an amplifier 203 having a gain of $K_{drvr}$, and the output of the amplifier 203 is coupled to a limit element 206. The elements 203 and 206 together correspond functionally to the voice coil motor power amplifier 51, which works with a 12 volt supply and cannot produce an output signal in excess of 12 volts. Thus, the limit element 206 limits the magnitude of the output signal from the amplifier 203 to an appropriate range.

The output of the limit element 206 is coupled to a positive input of a junction 207, the output of the junction 207 being coupled to the positive input of a further junction 208. The output of junction 208 is coupled to the input of a gain element 211 which has a gain 1/Lm, where Lm is an inductance of a coil of the voice coil motor 21. The output of the gain element 211 is coupled to a positive input of a junction 212, the output of which is coupled to the input of an integrator 213. The output of the integrator 213 is coupled to the input of a gain element 216 having a gain Kt, where Kt is a torque constant for the coil of the voice coil motor 21. The output of the gain element 216 is coupled to the positive input of a junction 217, the output of which is coupled to the input of a gain element 218. The gain element 218 has a gain 1/Jm, where Jm represents the mass of the parts moved by the voice coil motor 21.

The input to the element 218 represents a force, and the output represents acceleration. The output of the element 218 is coupled to the positive input of a junction 221, the output of which is coupled to the input of an integrator 222. Since the input to the integrator 222 represents acceleration, the output of the integrator 222 represents velocity, and is coupled to the positive input of a junction 223. The output of the junction 223 is coupled to the input of a further integrator 226, the output of which represents position. The output of the integrator 226 is coupled to the input of a gain element 227. The gain element 227 has a gain R, which represents the radial distance from the axle 23 (FIG. 1) to the read/write head 27. The output of the gain element 227 represents position, and in particular the position of the support arms 22 rather than the position of the read/write head.

The output of the gain element 227 is coupled to a negative input of a junction 228, the positive input to which is the actual position signal from line 35. The output of the junction 228 is thus an error signal representing the difference between the actual position of the read/write head indicated by the position signal 3S, and the position which the control loop 122 calculates that the read/write head is theoretically expected to have in response to the control signals output from the control system 106.

The error signal from junction 228 is supplied to the inputs of three gain elements 231–233. The gain elements 231–233 have respective gains of Lv3, Lv2 and Lv1, which are estimation gains that cause the gain elements to function as estimators. The outputs of the gain elements 231–233 are each coupled to a positive input of a respective one of the junctions 212, 221 and 223, in order to inject into the control loop respective estimator values developed from the error signal output by the junction 228.

As explained above, the outputs of the elements 226, 222, and 218 respectively represent position, velocity and acceleration. The outputs of the elements 226, 222, and 218 are coupled to the inputs of respective proportional gain elements 236–238, which have respective gains K1, K2 and K3. The outputs of the elements 236–238 are each coupled to a respective negative input of the junction 202, and the gain elements 236–238 are thus parts of respective feedback paths.

The output of the element 222 is also coupled to the input of a further gain element 241. The gain element 241 has a gain Kb representing the back emf of the coil in the voice coil motor 21. The output of the gain element 241 is coupled to a negative input of the junction 207. The gain element 241 is thus part of a further feedback path. The output of the element 213 is coupled to the input of another gain element 242, which has a gain Rm representing a resistance of a coil in the voice coil motor 21. The output of the element 242 is coupled to a negative input of junction 208, and the element 242 thus is part of yet another feedback path.

The microactuator spring effect adjustment block 124 includes a junction 246 with positive and negative inputs. The output of element 176 serves as the signal 136 which is coupled to the positive input of the junction 246, and the output of the element 227 serves as the signal 137 which is coupled to the negative input of the junction 246. The output of the junction 246 is coupled to an input of a gain element having a gain Kma, which is representative of a spring constant for the two spring portions 76 and 77 of the microactuator. The output of the element 247 is the signal 138, which is representative of the net force resulting from the opposed forces of the microactuator spring portions 76 and 77. The signal 138 is coupled to a negative input of the junction 167 and, through a gain element 249, to a positive input of the junction 217. The gain element 249 has a gain R, which is the same as the gain R of the element 227. The output of the junction 202 serves as the voice coil motor control signal supplied at 46 to the D/A converter 47.

In general terms, the microactuator control loop 121 takes the desired or target position signal 41 received through the gain element 151 and generates, with some feedback injected at the junction 152, an appropriate control signal 156 for the microactuator. The remaining elements of the microactuator control loop 121 combine the control signal 56 with real world characteristics of the electromechanical structure controlled by the signal 56, in order to derive at the output of the element 176 an expected or theoretical position of the read/write head 27. This theoretical or expected position is compared at 177 to the actual position of the read/write head indicated by signal 35, in order to develop an error signal that is fed back to the control loop through the estimator gain elements 181–183.

The gain elements 186–188 respectively scale signals corresponding to the position, velocity and acceleration of the read/write head, and effect the feedback control through junction 152. The elements 164 and 191 provide feedback paths corresponding to respective characteristics of the microactuator coil, namely back emf and resistance. The effect of the microactuator springs, represented by the signal 138 from the microactuator spring effect adjustment block 124, is taken into account in the control loop 121 through the junction 167.

The voice coil motor control loop 122 operates in a generally similar manner, except that the input signal 129 is based on the magnitude and direction of the displacement of the actuator platform from its equilibrium position. Thus, the control loop 122 controls the voice coil motor 21 as a slave or follower to the microactuator 26. Since the operation of the control loop 122 is generally similar to that of the control loop 121, a detailed explanation of the operation of the control loop 122 is believed unnecessary.

The microactuator spring effect block 124 of FIG. 6 models the primary characteristic of the microactuator spring portions 76 and 77, namely the net resilient force which they exert between the platform 72 and the base portion 71. However, there are secondary characteristics of the microactuator and the spring portions which may optionally be taken into account, including a damping characteristic and a stroke limit.

Figure 7:
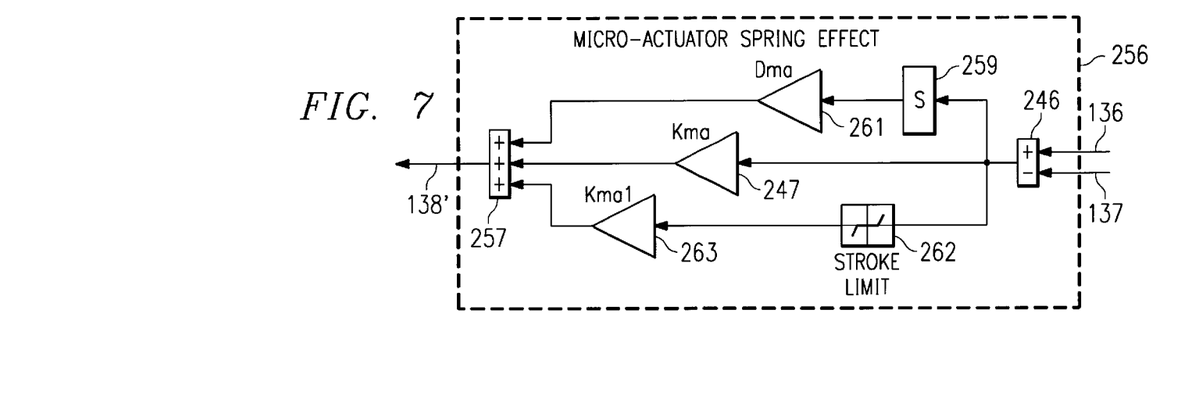
FIG. 7 is a block diagram of an alternative embodiment of a microactuator spring effect block that is a component of the control system of FIG. 6.

More specifically, FIG. 7 shows a microactuator spring effect adjustment block 256 which is an alternative embodiment of and which may be substituted for the block 124 in FIG. 6. With reference to FIG. 7, the block 256 includes a junction 246 and a gain element 247, which are equivalent to those depicted in FIG. 6 and are therefore identified with the same reference numerals. The output of the gain element 247 is coupled to a positive input of a junction 257, the output of which is a signal 138' that is functionally similar to the signal 138 of FIG. 6.

The output of the junction 246, which represents a position, is also coupled to the input of a differentiating element 259. Differentiation of a position yields a rate or velocity. The output of the differentiating element 259 is coupled to the input of a proportional gain element 261 which has a gain Dma, where Dma represents a damping characteristic of the microactuator spring portions 76 and 77. The output of the gain element 261 is coupled to a positive input of the junction 257. The block 256 also includes a stroke limit block 262 which receives the output signal from the junction 246. The stroke limit block 262 limits the magnitude of the signal from block 246 to a predefined range, in order to reflect the fact that the platform 72 of the microactuator 26 has a range of movement relative to the base portion 71 which is physically limited. The output of the stroke limit block 262 is coupled to a proportional gain element 263 having a gain Kmal, where Kmal is a scaling factor for the output of the stroke limit block 262. The output of the gain element 263 is coupled to a positive input of the junction 257.

The present invention provides various technical advantages. One such technical advantage is that a microactuator can be utilized in a hard disk drive, while avoiding the need to provide a position sensor to determine the actual position of the support member on which the microactuator movably supports the read/write head. This reduces the cost of the system, while achieving more efficient control through use of the dual actuator arrangement. In particular, seek times and thus access times are reduced. a further technical advantage is increased reliability, due to elimination of the need for a sensor and its associated support circuitry.

Although one embodiment has been illustrated and described in detail, it should be understood that various changes, substitutions and alterations can be made therein without departing from the scope of the present invention. For example, the disclosed embodiment utilizes a digital signal processor to control the position of the read/write head, but it will be recognized that the position of the read/write head could also be controlled by an analog control circuit. Moreover, a suitable control loop for the microactuator and a suitable control loop for the voice coil motor have been disclosed, but it will be recognized that there are many variations and modifications of these specific control loops which lie within the scope of the present invention. In this regard, it will be recognized that direct connections disclosed herein could be altered, such that two disclosed components or elements are coupled to one another through an intermediate device or devices without being directly connected, while still realizing the present invention. Other changes, substitutions and alterations are also possible without departing from the spirit and scope of the present invention as defined by the following claims.

What is claimed is:

1. A disk drive apparatus, comprising:
   a disk supported for rotation about an axis, and having thereon a magnetic surface for storage of information;
   a member supported for movement relative to said disk and said axis;
   an actuator for effecting controlled movement of said member relative to said disk and said axis;
   a microactuator disposed on said member;
   a read/write head supported by said microactuator for controlled movement in conjunction with said member, movement of said member by said actuator corresponding to movement of said read/write head adjacent to and in a direction approximately radially of said magnetic surface of said disk from said axis, aid movement of said read/write head by said microactuator corresponding to movement of said read/write head adjacent to and in a direction approximately radially of said magnetic surface of said disk from said axis;
   a position detector for generating a position signal representative of the position of said read/write head relative to said surface of said disk; and
   a control system responsive to the position signal and to an input signal specifying a target position of said read/write head relative to said surface of said disk concurrently controlling said actuator and said microactuator to position said read/write head at the target position with respect to said surface of said disk;
   said control system including a first control system portion responsive to said input signal for generating a microactuator control signal to control said microactuator and a second control system portion receiving a control input from said first control system portion and from said microactuator for generating an actuator control signal to control said actuator.

2. An apparatus according to claim 1, wherein said microactuator effects relative movement of said read/write head and said disk at a speed which is substantially faster than a speed at which said actuator effects relative movement of said read/write head and said disk.

3. An apparatus according to claim 1, wherein said actuator effects a range of relative movement of said read/write head and said disk which is substantially greater than a range of relative movement thereof effected by said microactuator.

4. An apparatus according to claim 1, wherein said control system includes a first portion responsive to the input signal for generating a microactuator control signal which is coupled to said microactuator, and includes a second portion responsive to the microactuator control signal for generating an actuator control signal which is coupled to said actuator.

5. An apparatus according to claim 1, wherein said microactuator has an initial state in which said read/write head is in a predetermined position with respect to the member; and wherein said microactuator is responsive to the microactuator control signal for moving said read/write head away from the predetermined position by a distance which is proportional to a magnitude of the microactuator control signal.

6. An apparatus according to claim 1, wherein said microactuator has an initial state in which said second portion is in a predetermined position with respect to said member, said microactuator being operative to move said second portion away from the predetermined position in either of first and second directions which are opposite in response to the microactuator control signal respectively having positive and negative polarities; and wherein said microactuator includes a resilient portion responsive to movement of said second portion away from the predetermined position in either of the first and second directions for urging movement of said second portion toward the predetermined position.

7. The disk drive apparatus of claim 1 wherein said microactuator has an initial state in which said read/write head is in a predetermined position with respect to said member, said microactuator responsive to the microactuator control signal for moving said read/write head away from the predetermined position by a distance which is proportional to a magnitude determined by the microactuator control signal, said control system including a third control portion which is responsive to the microactuator control signal and which outputs a control signal obtained by subjecting the microactuator control signal to integration and a gain, said input of said second control portion being coupled to the control signal from said third control portion.

8. The disk drive apparatus of claim 7 wherein said microactuator control signal provides primary control to first move said member and said actuator control signal provides secondary control to move said member after said first movement.

\* \* \* \* \*